United States Patent
Shim et al.

(10) Patent No.: US 10,772,007 B2
(45) Date of Patent: Sep. 8, 2020

(54) METHOD FOR TRANSMITTING AND RECEIVING DATA IN WIRELESS COMMUNICATION SYSTEM, AND DEVICE FOR SUPPORTING SAME

(71) Applicant: LG ELECTRONICS INC., Seoul (KR)

(72) Inventors: Hyunjin Shim, Seoul (KR); Jiwon Kang, Seoul (KR); Ilmu Byun, Seoul (KR); Heejeong Cho, Seoul (KR); Heejin Kim, Seoul (KR); Genebeck Hahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 21 days.

(21) Appl. No.: 16/098,835

(22) PCT Filed: Apr. 28, 2017

(86) PCT No.: PCT/KR2017/004588
§ 371 (c)(1),
(2) Date: Nov. 2, 2018

(87) PCT Pub. No.: WO2017/191952
PCT Pub. Date: Nov. 9, 2017

(65) Prior Publication Data
US 2019/0200259 A1  Jun. 27, 2019

Related U.S. Application Data

(60) Provisional application No. 62/330,857, filed on May 3, 2016, provisional application No. 62/334,465, filed on May 11, 2016.

(51) Int. Cl.
*H04W 28/06* (2009.01)
*H04W 28/02* (2009.01)
(Continued)

(52) U.S. Cl.
CPC ......... *H04W 28/065* (2013.01); *H04L 1/1812* (2013.01); *H04L 5/0055* (2013.01);
(Continued)

(58) Field of Classification Search
CPC ... H04W 28/065; H04W 28/14; H04W 28/02; H04W 28/16; H04W 28/0273;
(Continued)

(56) References Cited

U.S. PATENT DOCUMENTS

2013/0176918 A1   7/2013  Fu et al.
2016/0057585 A1*  2/2016  Horn ................ H04W 80/02
                                                            370/312

FOREIGN PATENT DOCUMENTS

KR   20150018248    2/2015
WO   2016028563     2/2016

OTHER PUBLICATIONS

PCT International Application No. PCT/KR2017/004588, International Search Report dated Aug. 23, 2017, 3 pages.
(Continued)

*Primary Examiner* — Dady Chery
(74) *Attorney, Agent, or Firm* — Lee Hong Degerman Kang Waimey

(57) ABSTRACT

The present invention relates to a method and a device for transmitting and receiving data by a terminal in a wireless communication system. The present invention can provide a method and a device configured to: generate at least one duplicated data according to the number of multiple radio bearers by using specific data in a first layer of a transmitting device; transmit the specific data and the at least one duplicated data to a receiving device on multiple cells associated with the multiple radio bearers; and when receiving, from the receiving device, an ACK indicating the success of reception of the specific data and the at least one
(Continued)

duplicated data, instruct to stop transmission of the specific data and the at least one duplicated data from the first layer to a second layer, wherein the multiple radio bearers are instructed, by a bearer identifier, to transmit the duplicated data.

11 Claims, 16 Drawing Sheets

(51) Int. Cl.
*H04W 28/14* (2009.01)
*H04L 1/18* (2006.01)
*H04L 5/00* (2006.01)
*H04W 28/16* (2009.01)

(52) U.S. Cl.
CPC ....... *H04W 28/02* (2013.01); *H04W 28/0268* (2013.01); *H04W 28/0273* (2013.01); *H04W 28/14* (2013.01); *H04W 28/16* (2013.01)

(58) Field of Classification Search
CPC ............. H04W 28/0268; H04L 5/0055; H04L 1/1812; H04L 5/001
See application file for complete search history.

(56) References Cited

OTHER PUBLICATIONS

TCL Communication Ltd., "Uplink bearer split for LTE WLAN radio aggregation," 3GPP TSG-RAN WG2 #93bis, R2-162789, Apr. 2016, 6 pages.
LG Electronics Inc., "5G user plane protocol design," 3GPP TSG-RAN WG2 #93bis, R2-162861, Apr. 2016, 5 pages.

* cited by examiner

【Figure 1】
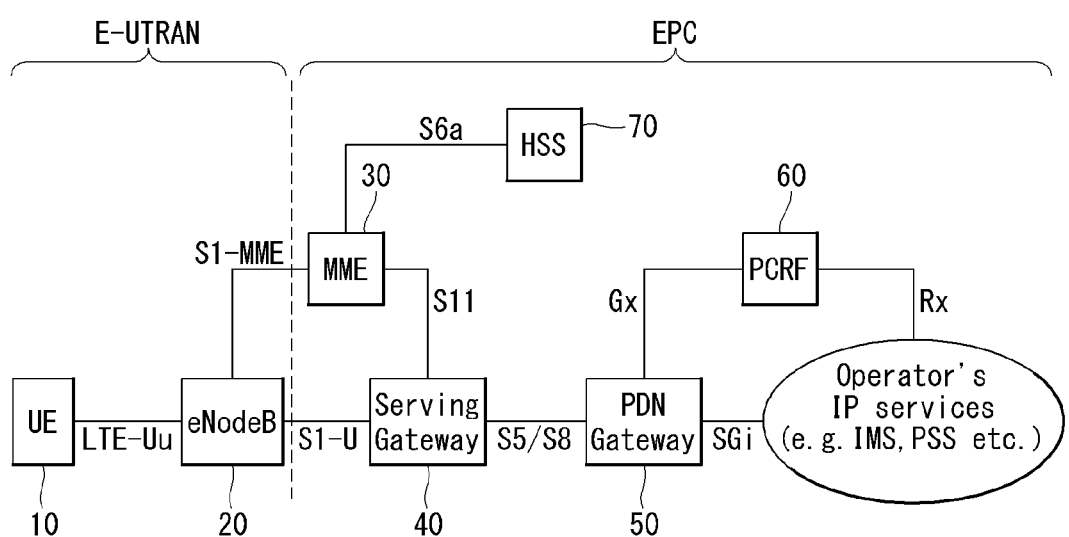

【Figure 2】
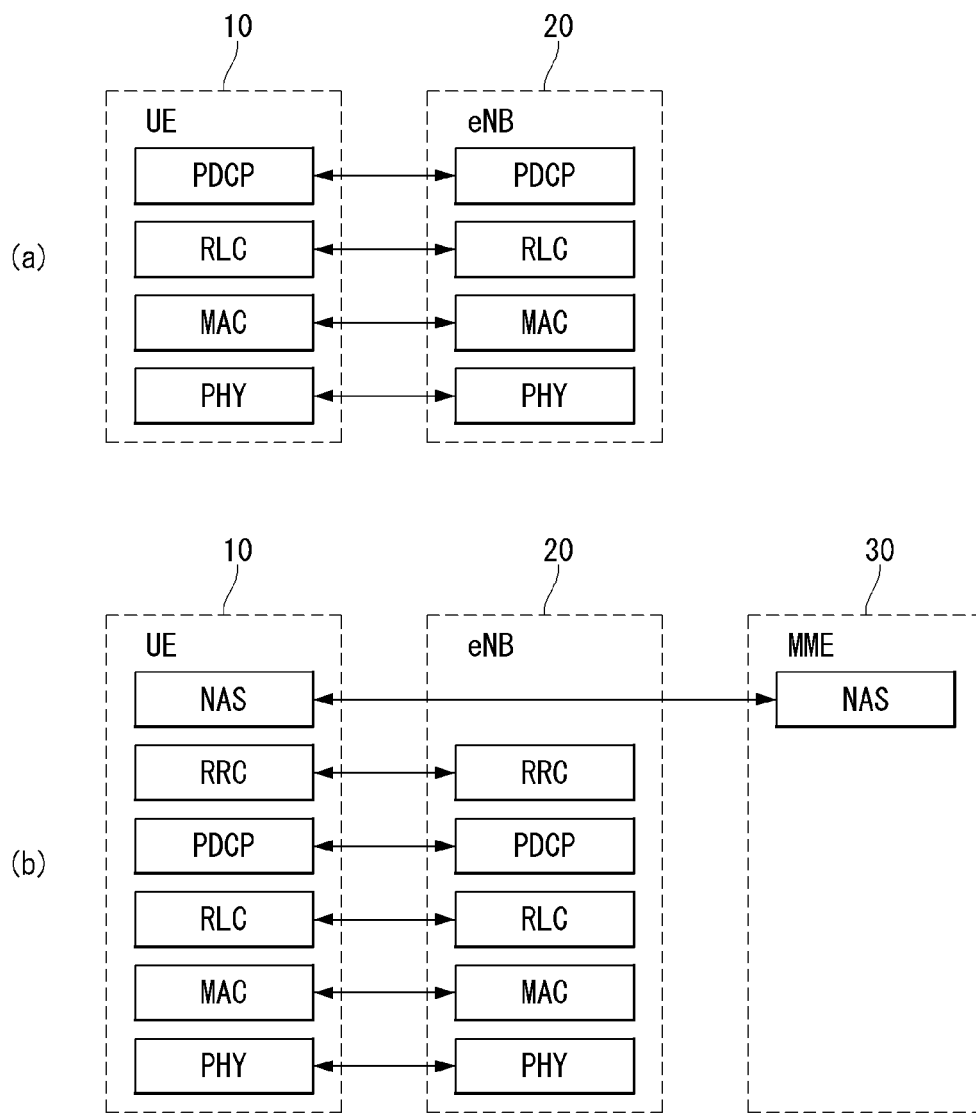

[Figure 3]
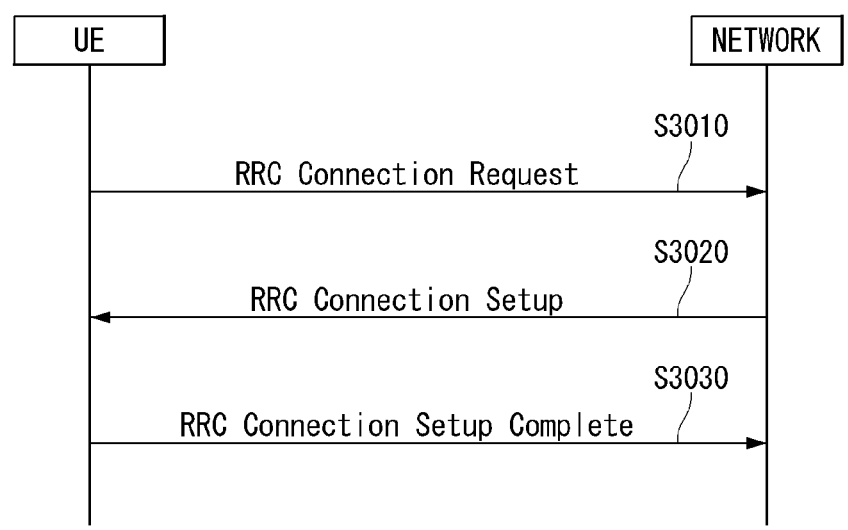

[Figure 4]
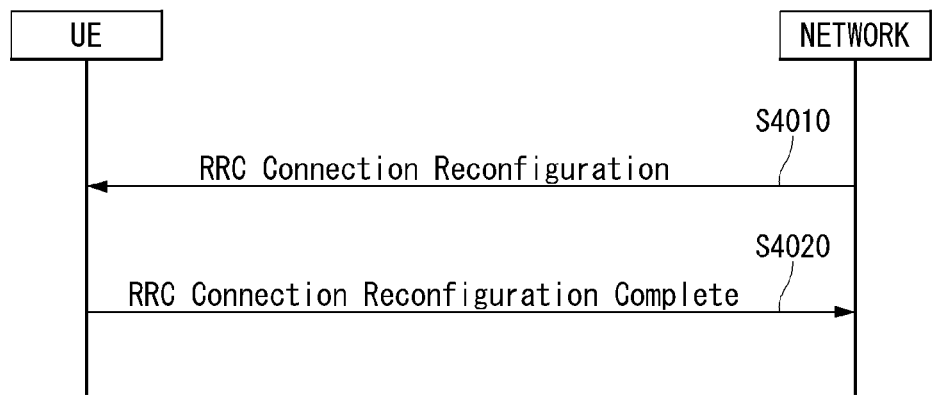

[Figure 5]
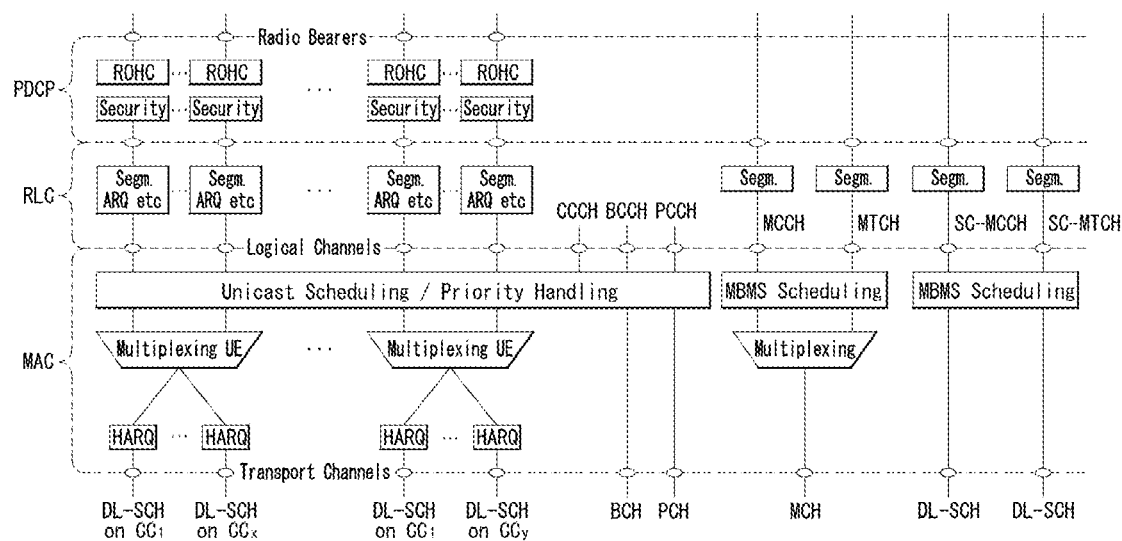

[Figure 6]
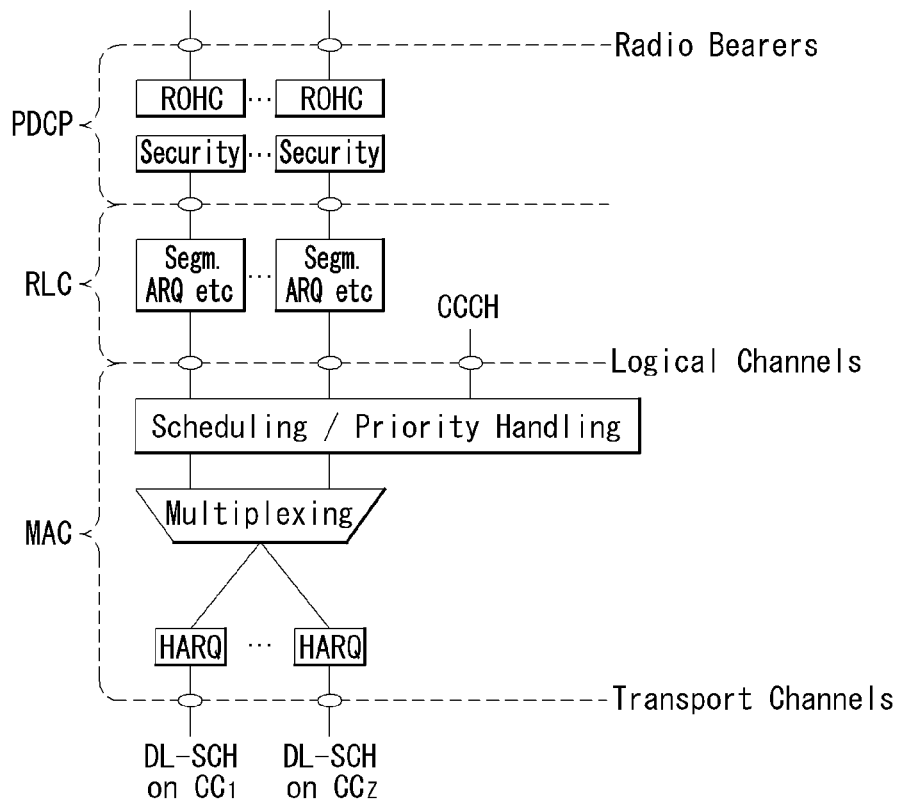

【Figure 7】
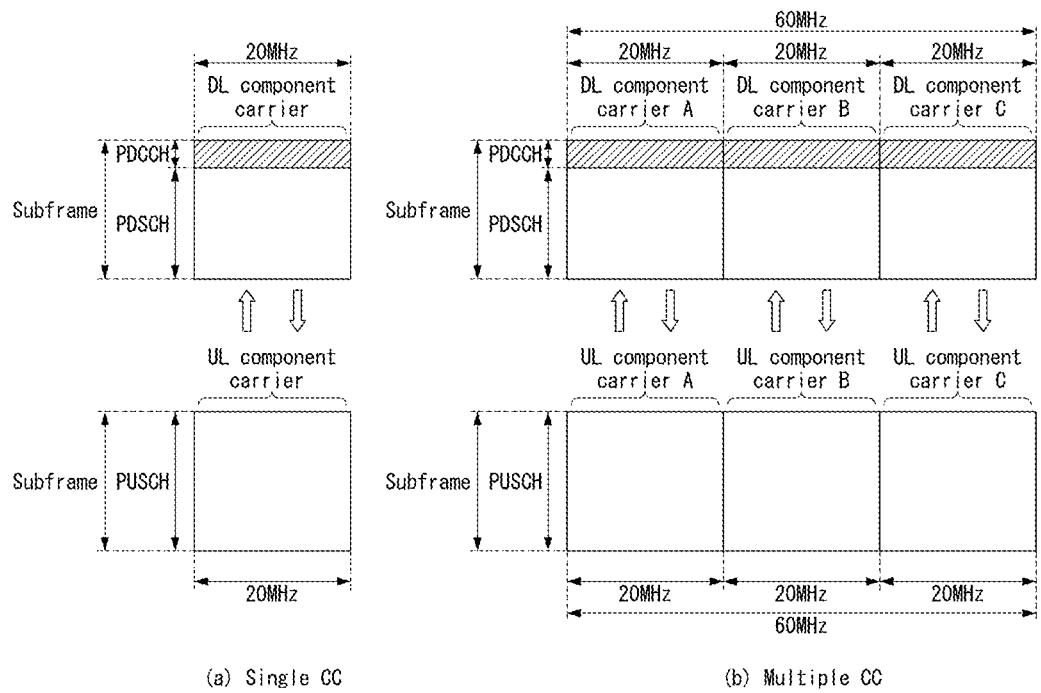

[Figure 8]
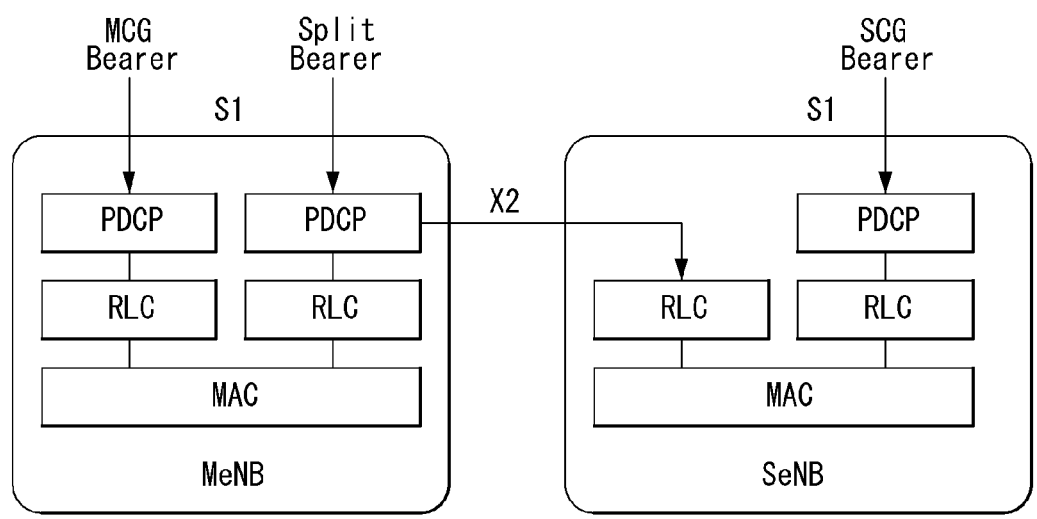

【Figure 9】
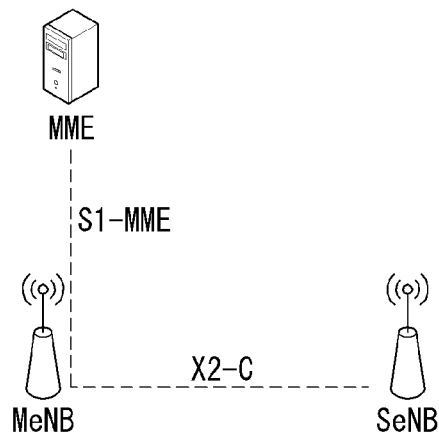
(a) C-Plane Connection
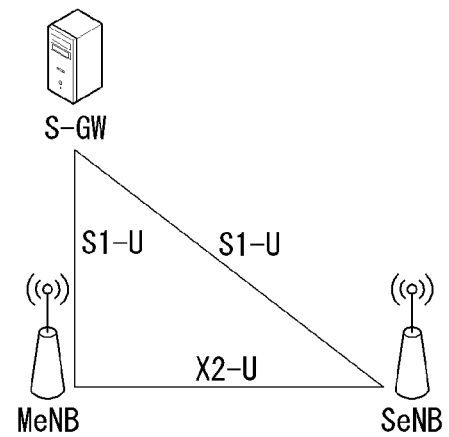
(b) U-Plane Connection

[Figure 10]
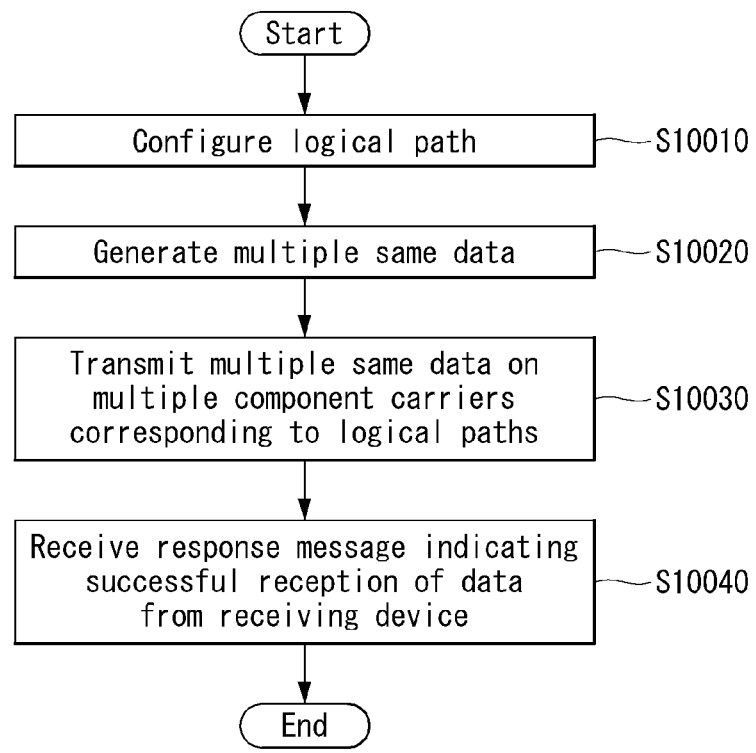

【Figure 11】
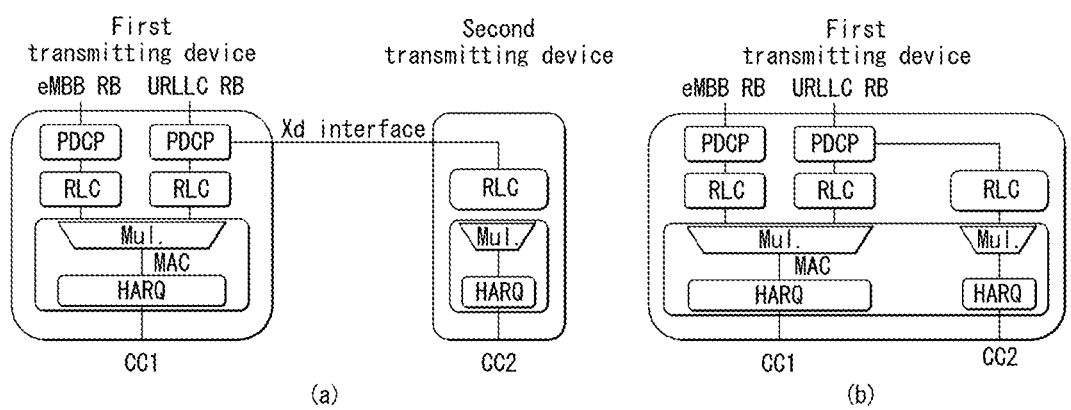

[Figure 12]
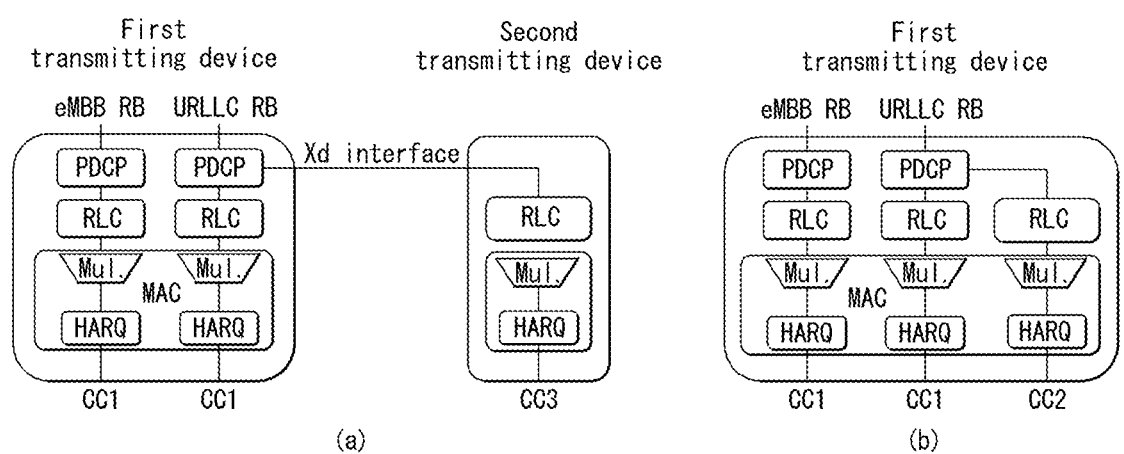

【Figure 13】
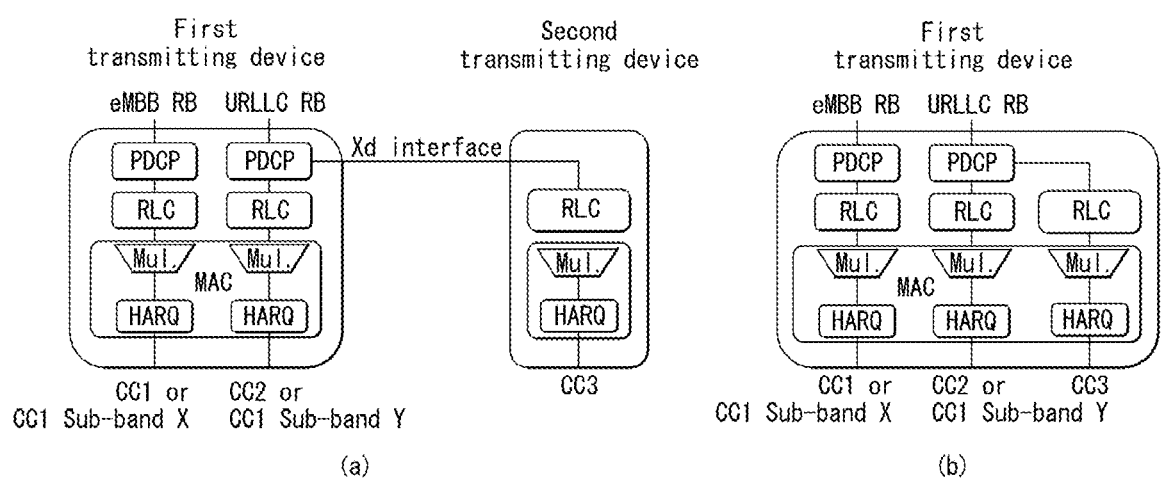

[Figure 14]
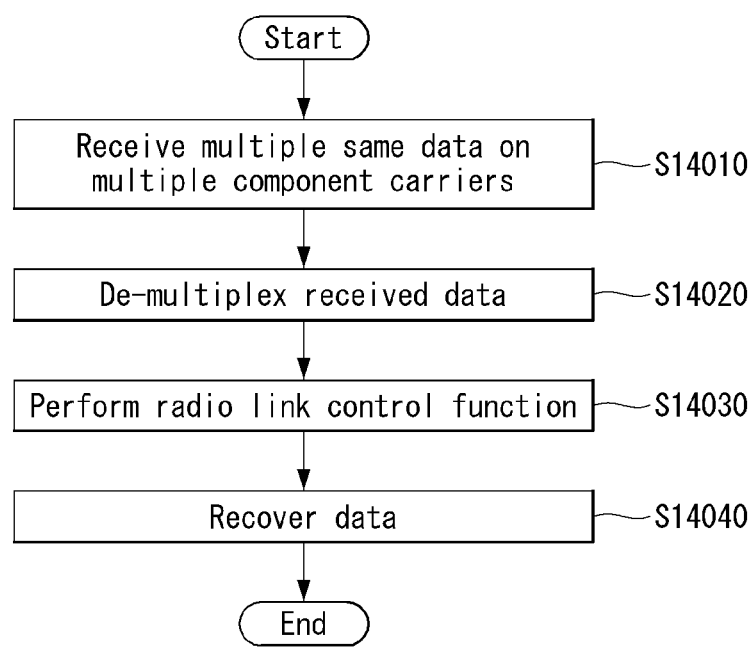

【Figure 15】
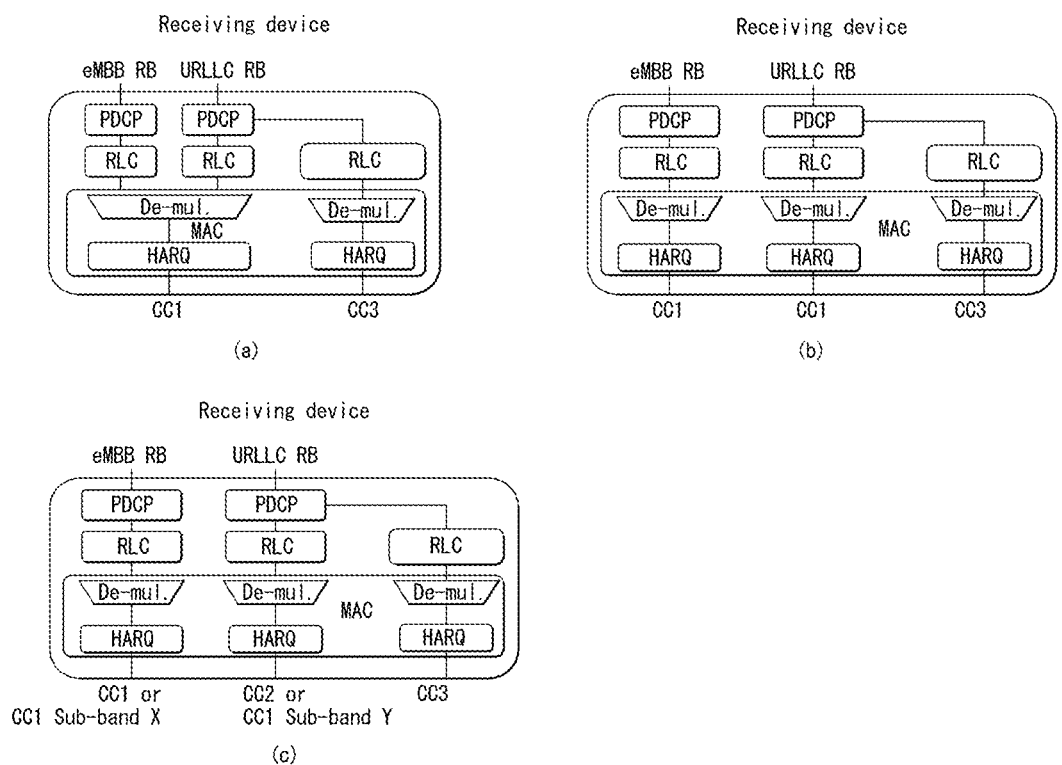

[Figure 16]
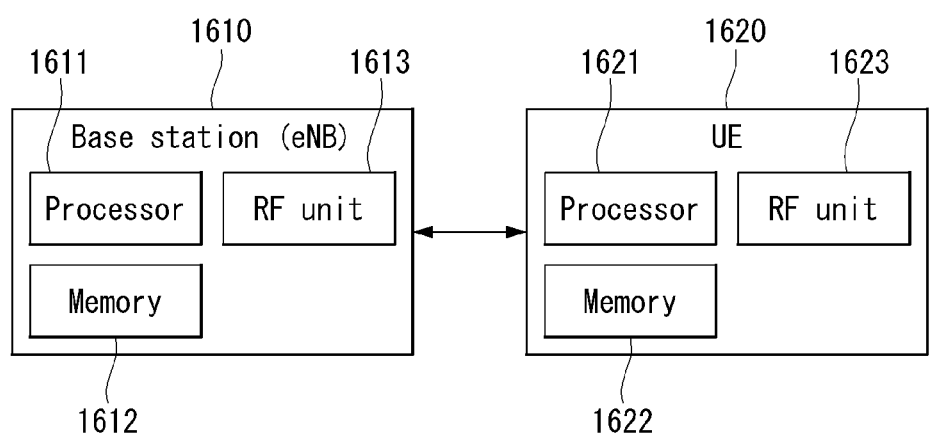

METHOD FOR TRANSMITTING AND RECEIVING DATA IN WIRELESS COMMUNICATION SYSTEM, AND DEVICE FOR SUPPORTING SAME

CROSS-REFERENCE TO RELATED APPLICATIONS

This application is the National Stage filing under 35 U.S.C. 371 of International Application No. PCT/KR2017/004588, filed on Apr. 28, 2017, which claims the benefit of U.S. Provisional Application No. 62/330,857, filed on May 3, 2016, and 62/334,465, filed on May 11, 2016, the contents of which are all hereby incorporated by reference herein in their entirety.

TECHNICAL FIELD

The present invention relates to a method for a user equipment to transmit and receive data in a wireless communication system and, more particularly, to a method of improving reliability of data transmission and reception and an apparatus supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method and a device for redundantly transmitting the same data so as to increase reliability of data transmission.

Another object of the present invention is to provide a method and a device for transmitting the same data via multiple component carriers (CCs) to which carrier aggregation (CA) is applied.

Another object of the present invention is to provide a method and a device for generating duplicate data through replication of data at a specific layer of a transmitting device.

Another object of the present invention is to provide a method and a device for defining an operation of each layer of a user equipment so as to transmit duplicated multiple same data through a plurality of logical paths.

Another object of the present invention is to provide a method and a device for configuring a separate identifier (ID) so as to identify a logical path for transmitting duplicate data.

Another object of the present invention is to provide a method and a device for processing duplicate data in a receiving device when receiving the duplicate data.

Another object of the present invention is to provide a method and a device for recovering data received by a receiving device when receiving duplicate data.

Technical problems to be solved by the present invention are not limited by the above-mentioned technical problems, and other technical problems which are not mentioned above can be clearly understood from the following description by those skilled in the art to which the present invention pertains.

Technical Solution

In order to solve the above-described and other problems, the present invention provides a method and a device for transmitting and receiving data in a wireless communication system.

More specifically, a method for transmitting and receiving data according to one embodiment of the present invention comprises generating at least one duplicate data according to a number of a plurality of radio bearers using specific data at a first layer of a transmitting device; transmitting the specific data and the at least one duplicate data to a receiving device on a plurality of cells associated with the plurality of radio bearers; and when receiving Ack indicating a reception success of the specific data and the at least one duplicate data from the receiving device, instructing a stop of transmission of the specific data and the at least one duplicate data from the first layer to a second layer, wherein in the plurality of radio bearers, a transmission of duplicate data is indicated by a bearer identifier.

In the present invention, the first layer performs a header compression function.

In the present invention, the specific data and the at least one duplicate data are reconfigured by the second layer.

In the present invention, the method further comprises delivering the specific data from a TCP/IP layer of the transmitting device to the first layer; and storing the specific data in a first transmission buffer of the first layer.

In the present invention, a number of the second layers is equal to a number of the specific data and the at least one duplicate data.

In the present invention, the specific data and the at least one duplicate data are reconfigured through a segmentation and concatenation function based on an allocated resource.

In the present invention, the allocated resource is determined by radio conditions, a transmission power, a transmission resource, or quality of service (QoS) of each of the plurality of radio bearers.

The present invention provides a method comprising receiving specific data and at least one duplicate data from a transmitting device on a plurality of cells associated with a plurality of radio bearers; delivering the specific data and the at least one duplicate data from a first layer of a receiving device to a second layer of the receiving device; storing one data among the specific data and the at least one duplicate data in a reception buffer of the second layer; and discarding remaining data excluding the one data from the specific data and the at least one duplicate data.

The method further comprises instructing a stop of transmission of data duplicated with the one data from the second layer to the first layer.

The method further comprises performing a radio link control function based on the specific data and the at least one duplicate data through the first layer. The radio link control function is one of a hybrid automatic repeat request (HARQ) function, a reassembly function of segmented or concatenated data, or a recovery function of lost data.

The method further comprises recovering the one data through the second layer; and delivering the recovered one data to a TCP/IP layer.

The method further comprises transmitting, to the transmitting device, Ack indicating a reception success of the specific data or the at least one duplicate data.

The present invention provides a transmitting device comprising a communication unit configured to transmit and receive a radio signal with an outside; and a processor functionally coupled to the communication unit, wherein the processor is configured to generate at least one duplicate data according to a number of a plurality of radio bearers using specific data at a first layer of the transmitting device, transmit the specific data and the at least one duplicate data to the receiving device on a plurality of cells associated with the plurality of radio bearers, and when receiving Ack indicating a reception success of the specific data and the at least one duplicate data from the receiving device, request a stop of transmission of the specific data and the at least one duplicate data from the first layer to a second layer, wherein in the plurality of radio bearers, a transmission of duplicate data is indicated by a bearer identifier.

Advantageous Effects

The present invention has an effect capable of increasing reliability of data transmission by transmitting the same data via multiple component carriers (CCs) to which carrier aggregation (CA) is applied, or multiple cells to which dual connectivity is applied.

The present invention has an effect capable of redundantly transmitting the same data by configuring or reconfiguring a logical path.

The present invention has an effect that a UE can identify a logical path through which duplicate data is transmitted by configuring a separate identifier (ID) so as to identify a logical path for the transmission of duplicate data.

The present invention has an effect that when the same uplink data is redundantly transmitted, a base station can identify whether or not the duplicated uplink data is transmitted by transmitting an indication or index information informing of the uplink data transmission via control information.

The present invention has an effect capable of generating multiple same data for providing the same service by generating duplicate data through replication of data in a specific layer of a transmitting device.

The present invention has an effect capable of transmitting multiple same data on one or more component carriers by individually reconfiguring the multiple same data because specific layers for reconfiguring generated multiple data according to allocated resources are present as many as the number of multiple data.

The present invention has an effect capable of efficiently processing transmitted multiple same data by discarding remaining data excluding one data from multiple same data received by a receiving device when receiving the multiple same data.

The present invention has an effect that when one of multiple same data is successfully received, resource waste resulting from the redundant transmission of multiple same data can be reduced by transmitting a response message to the successful reception and stopping the transmission of the multiple same data.

Effects obtainable from the present invention are not limited by the above-mentioned effect, and other effects which are not mentioned above can be clearly understood from the following description by those skilled in the art to which the present invention pertains.

DESCRIPTION OF DRAWINGS

The accompanying drawings, which are included herein as a part of a description in order to help understanding of the present invention, provide embodiments of the present invention, and describe the technical features of the present invention with the description below.

FIG. 1 illustrates an Evolved Packet System which is associated with the Long Term Evolution (LTE) system to which the present invention can be applied.

FIG. 2 is a block diagram illustrating an example of a radio protocol architecture to which technical features of the present invention are applicable.

FIG. 3 is a flowchart illustrating a process of establishing an RRC connection to which the present invention is applicable.

FIG. 4 is a flowchart illustrating an RRC connection reconfiguration process to which the present invention is applicable.

FIGS. 5 and 6 are diagrams showing examples of Layer 2 structures in carrier aggregations to which the present invention is applicable.

FIG. 7 is a diagram showing an example of component carriers and carrier aggregations in a wireless communication system to which the present invention is applicable.

FIGS. 8 and 9 illustrate an example of a structure of dual connectivity and a network interface to which the present invention is applicable.

FIG. 10 is a flow chart illustrating an example of a method for transmitting the same data proposed by the present specification.

FIGS. 11 to 13 illustrate an example of a multiplexing method for transmitting the same data proposed by the present specification.

FIGS. 14 and 15 illustrate an example of a method and a de-multiplexing method for receiving and processing the same data proposed by the present specification.

FIG. 16 illustrates an example of an internal block diagram of a wireless device to which the present invention is applicable.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with the term "fixed station", "base station (BS)", "Node B", "base transceiver system (BTS),", "access point (AP)", "MeNB (Macro eNB)", "SeNB (Secondary eNB)" etc. The term "user equipment (UE)" may be replaced with the term "terminal", "mobile station (MS)", "user terminal (UT)", "mobile subscriber station (MSS)", "subscriber station (SS)", "Advanced Mobile Station (AMS)", "Wireless terminal (WT)", "Machine-Type Communication (MTC) device", "Machine-to-Machine (M2M) device", "Device-to-Device (D2D) device", wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), "non-orthogonal multiple access (NOMA)", etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

Embodiments of the present invention may be supported by the standard documents disclosed in at least one of IEEE 802, 3GPP and 3GPP2 that are radio access systems. That is, steps or portions not described so that the technical spirit of the present invention is not clearly exposed in the embodiments of the present invention may be supported by the documents. Furthermore, all terms disclosed in this document may be described by the standard documents.

In order to clarify the description, 3GPP LTE/LTE-A is basically described, but the technical characteristic of the present invention is not limited thereto and may be applied to a 5G system.

Prior to a description given with reference to the drawings, in order to help understanding of the present invention, terms used in this specification are defined in brief.

EPS: an abbreviation of an evolved packet system, and the EPS means a core network supporting a long term evolution (LTE) network. It is a network of a form in which an UMTS has been evolved Public data network (PDN): an independent network where a server providing services is located Access point name (APN): It is provided to a UE in the name of an access point managed by a network. That is, this indicates the name (text string) of a PDN. A corresponding PDN for the transmission and reception of data is determined based on the name of an access point.

Tunnel endpoint identifier (TEID): an end point ID of a tunnel configured between nodes within a network, and the TEID is configured for each section in a bearer unit of each UE.

MME: an abbreviation of a mobility management entity, and the MME functions to control each entity within an EPS in order to provide a session and mobility for a UE.

Session: a session is a passage for data transmission, and a unit thereof may be a PDN, a bearer or an IP flow unit.

A difference between units may be divided into a target network entire unit (APN or PDN unit), a unit (bearer unit) classified as QoS therein, and a destination IP address unit as defined in 3GPP.

EPS Bearer: a logical path generated between a UE and a gateway, in which a variety of types of traffic is transmitted and received.

Default EPS bear: a logical path for data transmission and reception basically generated when a UE accesses a network and can be maintained until the UE is detached from the network.

Dedicated EPS bearer: a logical path generated when it is necessary to additionally provide services after a default EPS bearer is generated.

IP flow: a variety of types of traffic transmitted and received through a logical path between a UE and a gateway.

Service data flow (SDF): a combination of IP flows of user traffic or multiple IP flows classified depending on a service type.

PDN connection: this indicates a connection from a UE to a PDN, that is, association (connection) between a UE represented as an ip address and a PDN represented as an APN. This means a connection (UE-PDN GW) between entities within a core network so that a session can be formed.

UE Context: context information of a UE used to manage a UE in a network, that is, context information including a UE id, mobility (current location), and the attributes (QoS, priority) of a session FIG. 1 is a view illustrating an Evolved Packet System which is associated with the Long Term Evolution (LTE) system to which the present invention may apply.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 is a block diagram illustrating an example of a radio protocol architecture to which technical features of the present invention are applicable.

In FIG. 2, (a) is a block diagram illustrating an example of a radio protocol architecture for a user plane, and (b) is a block diagram illustrating an example of a radio protocol architecture for a control plane.

The user plane is a protocol stack for user data transmission, and the control plane is a protocol stack for a control signal transmission.

Referring to (a) and (b) of FIG. 2, a physical (PHY) layer provides information transfer services to an upper layer using a physical channel. The PHY layer is connected to a medium access control (MAC) layer, that is an upper layer, through a transport channel. Data moves between the MAC layer and the PHY layer through the transport channel. The transport channel is classified according to how and which feature data is transmitted via a radio interface.

Data moves between different PHY layers, i.e., between a PHY layer of a transmitter and a PHY layer of a receiver through a physical channel. The physical channel may be modified in an orthogonal frequency division multiplexing (OFDM) scheme and utilizes a time and a frequency as radio resources.

Functions of the MAC layer include mapping between a logical channel and a transport channel and multiplexing/demultiplexing of a MAC service data unit (SDU) belonging to the logical channel to a transport block provided to the physical channel on the transport channel, where the meaning of '/' includes both concepts of 'or' and 'and'. The MAC layer provides services to a radio link control (RLC) layer through the logical channel.

Functions of the RLC layer include concatenation, segmentation, and reassembly of a RLC SDU. In order to ensure various quality of services (QoS) demanded by a radio bearer (RB), the RLC layer provides three operation modes of a transparent mode (TM), an unacknowledged mode (UM), and an acknowledged mode (AM). AM RLC provides error correction through an automatic repeat request (ARQ).

A radio resource control (RRC) layer is defined only in the control plane. The RRC layer is responsible for the control of the logical channel, the transport channel, and the physical channels in association with configuration, reconfiguration, and release of radio bearers. The RB indicates a logical path provided by a first layer (i.e., PHY layer) and a second layer (i.e., MAC layer, RLC layer, and PDCP layer) for data transfer between a UE and a network.

Functions of a packet data convergence protocol (PDCP) layer in the user plane include transfer of user plane data, header compression, and ciphering. Functions of the PDCP layer in the control plane include transfer of control plane data and ciphering/integrity protection.

The configuration of the RB indicates a process for specifying a radio protocol layer and properties of channels to provide a specific service and configuring respective detailed parameters and operating methods. The RB may also be divided into a signaling radio bearer (SRB) and a data radio bearer (DRB). The SRB is used as a path for sending an RRC message in the control plane, and the DRB is used as a path for sending user data in the user plane.

If an RRC connection is established between an RRC layer of the UE and an RRC layer of an E-UTRAN, the UE is in an RRC connected state, and otherwise the UE is in an RRC idle state.

Examples of a downlink transport channel for transmitting data from the network to the UE include a broadcast channel (BCH) for transmitting system information and a downlink shared channel (SCH) for transmitting user traffic or a control message. A traffic or a control message of downlink multicast or broadcast service may be transmitted through the downlink SCH, or may also be transmitted through a separate downlink multicast channel (MCH). Examples of an uplink transport channel for transmitting data from the UE to the network include a random access channel (RACH) for transmitting an initial control message and an uplink shared channel (SCH) for transmitting user traffic or a control message.

Examples of a logical channel which is located above the transport channel and is mapped to the transport channel include a broadcast control channel (BCCH), a paging control channel (PCCH), a common control channel (CCCH), and a multicast control channel (MCCH), and a multicast traffic channel (MTCH).

The physical channel includes several OFDM symbols in a time domain and several subcarriers in a frequency domain. One subframe includes a plurality of OFDM symbols in the time domain. A resource block, as a resource allocation unit, includes a plurality of OFDM symbols and a plurality of subcarriers. Each subframe may use specific subcarriers of specific OFDM symbols (e.g., first OFDM symbol) of a corresponding subframe for a physical downlink control channel (PDCCH), i.e., an L1/L2 control channel. A transmission time interval (TTI) is a unit time of subframe transmission.

FIG. 3 is a flowchart showing an RRC connection establishment procedure to which the present invention may apply.

A UE sends to a network an RRC connection request message for requesting an RRC connection (S3010). The network sends an RRC connection setup message in response to the RRC connection request (S3020). After receiving the RRC connection setup message, the UE enters an RRC connection mode.

The UE sends to the network an RRC connection setup complete message used to confirm successful completion of the RRC connection establishment (S3030).

FIG. 4 is a flowchart showing an RRC connection reconfiguration procedure to which the present invention may apply.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S4010). In response to the RRC connection reconfiguration, the UE sends to the network an RRC connection reconfiguration complete message used to confirm successful completion of the RRC connection reconfiguration (S4020).

General Carrier Aggregation

A communication environment considered in the embodiments of the present invention includes all of multi-carrier support environments.

That is, a multi-carrier system or carrier aggregation (CA) system used in the present invention refers to a system using an aggregation of one or more component carriers (CCs) having a bandwidth smaller than a target band when a target wideband is configured in order to support the wideband.

In the present invention, a multi-carrier means an aggregation of carriers (or a carrier aggregation). In this case, an aggregation of carriers means both an aggregation between contiguous carriers and an aggregation between non-contiguous carriers.

Furthermore, the number of component carriers aggregated in the downlink and the number of component carriers aggregated in the uplink may be differently configured. A case where the number of downlink component carriers (hereafter referred to as a "DL CC") and the number of uplink component carriers (hereafter referred to as an "UL CC") are the same is called a symmetric aggregation. A case where the number of DL CCs and the number of UL CCs are different is called an asymmetric aggregation. Such a carrier aggregation may be interchangeably used with terms, such as a carrier aggregation, a bandwidth aggregation and a spectrum aggregation.

A carrier aggregation composed of a combination of two or more component carriers has a target of supporting a 100 MHz bandwidth in the LTE-A system. When one or more carriers having a bandwidth smaller than a target band are combined, the bandwidth of the combined carrier may be limited to a bandwidth used in the existing system in order to maintain backward compatibility with the existing IMT system. For example, the existing 3GPP LTE system supports {1.4, 3, 5, 10, 15, 20} MHz bandwidths, and a 3GPP LTE-advanced system (i.e., LTE-A) may support a bandwidth greater than 20 MHz using only the bandwidths for compatibility with the existing system.

Furthermore, a carrier aggregation system used in the present invention may define a new bandwidth regardless of a bandwidth used in the existing system in order to support a carrier aggregation.

An LTE-A system uses the concept of a cell in order to manage radio resources.

The aforementioned carrier aggregation environment may refer to a multi-cell environment. A cell is defined as a combination of a pair of a downlink resource (DL CC) and an uplink resource (UL CC), but the uplink resource is not an essential element. Accordingly, a cell may include a downlink resource solely or a downlink resource and an uplink resource. If a specific UE has only one configured serving cell, it may have one DL CC and one UL CC. If a specific UE has two or more configured serving cells, it has DL CCs corresponding to the number of cells. The number of UL CCs may be equal to or smaller than the number of DL CCs.

Alternatively, a DL CC and an UL CC may be configured to the contrary. That is, if a specific UE has multiple configured serving cells, a carrier aggregation environment in which the number of UL CCs is greater than the number of DL CCs may be supported. That is, a carrier aggregation may be understood as an aggregation of cells having two or more different carrier frequencies (center frequency of a cell). A "cell" referred in this case needs to be distinguished from a "cell" as a commonly used area covered by a base station.

A cell used in the LTE-A system includes a primary cell (PCell) and a secondary cell (SCell). A P cell and an S cell may be used as a serving cell. In the case of a UE which is in the RRC_CONNECTED state, but in which a carrier aggregation has not been configured or which does not support a carrier aggregation, only one serving cell including a P cell is present. In contrast, in the case of a UE which is in the RRC_CONNECTED state and in which a carrier aggregation has been configured, one or more serving cells may be present. All of serving cells include a P cell and one or more S cells.

A serving cell (P cell and S cell) may be configured through an RRC parameter. PhysCellId is the physical layer identifier of a cell and has an integer value from 0 to 503. SCellIndex is a short identifier used to identify an S cell and has an integer value from 1 to 7. ServCellIndex is a short identifier used to identify a serving cell (P cell or S cell) and has an integer value from 0 to 7. A 0 value is applied to a P cell, and SCellIndex is previously assigned to be applied to an S cell. That is, a cell having the smallest ID (or cell index) in ServCellIndex becomes a P cell.

A P cell means a cell operating on a primary frequency (or primary CC). A P cell may be used by a UE to perform an initial connection establishment process or a connection reconfiguration process, and may refer to a cell indicated in a handover process. Furthermore, a P cell means a cell that is the center of control-related communication among serving cells configured in a carrier aggregation environment. That is, a UE may receive a PUCCH allocated only in its P cell and perform transmission, and may use a P cell to obtain system information or change a monitoring procedure. An evolved universal terrestrial radio access network (E-UTRAN) may change only a P cell for a handover procedure using an RRC connection reconfiguration (RRC-ConnectionReconfiguration) message including mobility control information (mobilityControlInfo) with respect to a UE supporting a carrier aggregation environment.

An S cell may mean a cell operating on a secondary frequency (or secondary CC). Only one P cell is allocated to a specific UE, and one or more S cells may be allocated to a specific UE. An S cell may be configured after an RRC connection is established and may be used to provide an additional radio resource.

A PUCCH is not present in the remaining cells, that is, an S cell, except a P cell of serving cells configured in a carrier aggregation environment. An E-UTRAN may provide all of types of system information related to the operation of a cell in the RRC_CONNECTED state through a dedicated signal when adding an S cell to a UE supporting a carrier aggregation environment. A change in the system information may be controlled by the release and addition of a related S cell. In this case, an RRC connection reconfiguration (RRC-ConnectionReconfiguration) message of a higher layer may be used. An E-UTRAN may perform dedicated signaling having a different parameter for each UE rather than broadcasting within a related S cell.

After an initial security activation process starts, an E-UTRAN may configure a network including one or more S cells by adding them to a P cell initially configured in a connection configuration process. In a carrier aggregation environment, a P cell and an S cell may operate as respective component carriers. In the following embodiment, a primary component carrier (PCC) may be used as the same meaning as a P cell, and a secondary component carrier (SCC) may be used as the same meaning as an S cell.

FIGS. 5 and 6 are diagrams showing examples of Layer 2 structures in a carrier aggregation to which the present invention may be applied.

FIG. 5 shows an example of a Layer 2 structure in a carrier aggregation for the transmission of downlink data, and FIG. 6 shows an example of a Layer 2 structure in a carrier aggregation for the transmission of uplink data.

Referring to FIGS. 5 and 6, in the case of a carrier aggregation, in order for one HARQ entity to be required in each serving cell, a multi-carrier of a physical layer is exposed only in a MAC layer.

In the uplink and downlink, if one independent HARQ entity is present in each serving cell and spatial multiplexing is not present, one transport block is generated for each TTI in each serving cell. Each transport block and potential HARQ retransmissions thereof are mapped to a single serving cell.

FIG. 7 is a diagram showing an example of component carriers and carrier aggregations in a wireless communication system to which the present invention may be applied.

FIG. 7(a) shows a single carrier structure used in the LTE system. A component carrier may include a DL CC and an UL CC. One component carrier may have a frequency range of 20 MHz.

FIG. 7(b) shows carrier aggregation structured in the LTE_A system. FIG. 7(b) shows a case where 3 component carriers, each one having a frequency size of 20 MHz, have been combined. Three DL CCs and three UL CCs are included, but the number of DL CCs and UL CCs is not limited. In the case of a carrier aggregation, a UE can monitor three CCs at the same time, can receive a downlink signal/data, and can transmit an uplink signal/data.

If N DL CCs are managed in a specific cell, a network may allocate M (M≤N) DL CCs to a UE. In this case, the UE may monitor only the M limited DL CCs and receive a DL signal. Furthermore, the network may allocate major DL CCs to the UE by giving priority to L (L≤M≤N) DL CCs. In such a case, the UE must monitor the L DL CCs. Such a method may be identically applied to uplink transmission.

Linkage between the carrier frequency (or DL CC) of a downlink resource and the carrier frequency (or UL CC) of an uplink resource may be indicated by a higher layer message, such as an RRC message, or system information. For example, a combination of a DL resource and an UL resource may be configured by linkage defined by a system information block Type2 (SIB2). Specifically, the linkage may mean a mapping relation between a DL CC in which a PDCCH carrying an UL grant is transmitted and an UL CC using the UL grant, and may mean a mapping relation between a DL CC (or UL CC) in which data for an HARQ is transmitted and an UL CC (or DL CC) in which an HARQ ACK/NACK signal is transmitted.

Dual Connectivity (DC)

FIGS. 8 and 9 illustrate an example of a structure of dual connectivity (DC) and a network interface to which the present invention is applicable.

In a heterogeneous network supporting small cell evolution, there are various requirements related to mobility robustness, increased signaling load due to frequent handover, improvement of per-user throughput, system capacity, etc.

As a solution to realize these requirements, E-UTRAN supports dual connectivity (DC) operation whereby a multiple RX/TX UEs in RRC_CONNECTED is configured to utilize radio resources provided by two distinct schedulers, located in two eNBs connected via a non-ideal backhaul over the X2 interface.

The dual connectivity may imply control and data separation. For example, control signaling for mobility is provided via a macrocell at the same time as high-speed data connection is provided via a small cell.

Further, a separation between downlink and uplink and a connection between the downlink and the uplink are provided via different cells.

eNBs related to dual connectivity for a specific UE may assume two different roles. For example, as shown in FIGS. 8 and 9, one eNB may act as an MeNB or an SeNB.

In the dual connectivity, a UE may be connected to one MeNB and one SeNB.

The MeNB is an eNB which terminates at least one S1-MME in dual connectivity, and the SeNB is an eNB providing additional radio resources for the UE, but is not a master eNB in dual connectivity.

In addition, DC with CA configured means an operation mode of the UE in an RRC_CONNECTED state and is configured with a master cell group and a secondary cell group.

Here, "cell group" indicates a group of serving cells associated with a master eNB (MeNB) or a secondary eNB (SeNB) in dual connectivity.

"Master Cell Group (MCG)" is a group of serving cells associated with the MeNB and includes a primary cell (PCell) and optionally one or more secondary cells (SCells) in dual connectivity.

"Secondary Cell Group (SCG)" indicates a group of serving cells associated with a SeNB including primary SCell (pSCell) and optionally one or more SCells.

Here, "cell" described below should be distinguished from a 'cell' as a general region covered by an eNB. That is, the cell indicates a combination of downlink and optionally uplink resources.

The linking between a carrier frequency (e.g., center frequency of the cell) of downlink resources and a carrier frequency of uplink resources is indicated in system information transmitted on the downlink resources.

MCG bearer is radio protocols located only in the MeNB to use only MeNB resources in dual connectivity, and SCG bearer is radio protocols located only in the SeNB to use SeNB resources in dual connectivity.

Split bearer is radio protocols located in both the MeNB and the SeNB to use both MeNB resources and SeNB resources in dual connectivity.

As requirements for supporting various real-time application services increase, future communication technologies such as 5G are aiming at constructing ultra-low latency systems with an extremely short response time to meet various requirements.

Because services requiring the ultra-low latency consider a scenario requiring both a latency and high reliability data transmission, there is a need for a technology (ultra-reliable and low latency communication (URLLC)) that allows data to be transmitted quickly at high reliability (about 99.999%).

The low latency high reliability services require high reliability by transmitting a data packet in a short TTI. As a method for satisfying the high reliability, there is a transmission through a time diversity scheme and a transmission through a frequency diversity scheme.

The time diversity scheme means a scheme capable of securing good transmission quality by combining again reception data transmitted from a reception side if a transmission side transmits the same data several times at a time interval on a time axis.

The frequency diversity scheme means a scheme capable of preventing fading by selecting good reception data or combining different data using different reception properties at each frequency if a transmission side transmits the same data at several frequencies on a frequency axis.

Because the low latency high reliability services transmit data in a short TTI, it is difficult to obtain a gain using the time diversity scheme among the two schemes. Thus, if different frequencies of the above-mentioned multi-cell/different carrier are used for data transmission, a gain of the frequency diversity can be obtained.

Because the low latency high reliability services transmit the data packet in the short TTI, a large amount of bandwidth may be required. In this instance, since it is possible to transmit data to different cells in dual connectivity (DC) that is a multi-cell utilization technology described above, a wider bandwidth can be used.

Further, if a multi-carrier utilization technology, a carrier aggregation (CA) technology, is used, a wider bandwidth can be obtained because several component carriers (CCs) are used.

However, in an existing system, because the DC and CA technologies have been implemented for the purpose of improving the throughput of the UE or traffic offloading, they are not suitable for the low latency high reliability services. Thus, in a future communication system, the DC and CA technologies should be designed to increase data reliability as well as data throughput.

Further, the current DC and CA technologies have a problem that a method for duplicating and configuring a unit of transmission so as to transmit the same data via multi-cell/multi-carrier is not supported.

Accordingly, in order to solve the problem, the present invention proposes a method for duplicating corresponding data and transmitting and receiving the duplicate data so that the same data is redundantly transmitted and received via the multi-cell/different carrier.

Hereinafter, the present invention assumes that Layer 2 of a UE or a base station includes N sublayers.

In the present invention, when uplink data is transmitted and received, the UE may be called a transmitting device, and the base station may be called a receiving device. When downlink data is transmitted and received, the UE may be called a receiving device, and the base station may be called a transmitting device.

FIG. 10 is a flow chart illustrating an example of a method for transmitting the same data proposed by the present specification.

Referring to FIG. 10, when transmission of multiple duplicate data via multi-cell/multi-carrier is activated, a UE or a base station may replicate one data, generate multiple same data, and transmit the generated multiple same data via the multi-cell or the multi-carrier.

Hereinafter, a function of transmitting multiple same data via multi-cell or different carrier is referred to as duplicated data TX.

More specifically, the UE and the base station may configure or reconfigure a plurality of logical paths for transmitting and receiving multiple same data in a process for configuring or reconfiguring an initial logical path (e.g., data radio bearer (DRB)) and may allocate a specific logical path identifier (e.g., DRB identifier (ID)) to each of the plurality of configured logical paths in S10010.

The base station transmits system information including the allocated specific logical path identifiers to the UE.

The UE may recognize logical paths capable of transmitting the multiple same data through the specific logical path identifiers transmitted from the base station and may transmit and receive the multiple same data through the corresponding logical paths.

Alternatively, in a process for configuring an initial logical path between the UE and the base station, the base station transmits, to the UE, an indication message including an indication indicating a logical path configured for the transmission of multiple same data.

The UE may recognize whether or not a logical path configured via the transmitted indication message is the logical path configured for the transmission of the same data and may transmit and receive multiple same data through corresponding logical paths if the configured logical path is the logical path configured for the transmission of the same data.

As another example, the base station may inform the UE of whether or not a logical path configured via an RRC message is the logical path configured for the transmission of multiple same data.

For example, the base station transmits, to the UE, an RRC message including an indication indicating the logical path configured for the transmission of multiple same data.

The UE may recognize whether or not a logical path configured via the transmitted RRC message is the logical path configured for the transmission of the same data and may transmit and receive multiple same data through corresponding logical paths if the configured logical path is the logical path configured for the transmission of the same data.

Next, when data for providing a specific service (e.g., URLLC service, etc.) requiring high reliability and low latency is generated, the UE or the base station (hereinafter, the transmitting device) generates multiple same data in S10020.

For example, when data (e.g., TCP/IP packet) for providing a specific service requiring the URLLC described above is generated, a third sublayer (e.g., a PDCP layer of a 3GPP LTE/LTE-A system) of Layer 2 of the transmitting device duplicates (or replicates) data, which is generated as many as the number of configured logical paths or the number of multi-cell/multi-carrier associated with (or corresponding to) the configured logical paths, and delivers the duplicated data to a second sublayer (e.g., an RLC layer of the 3GPP LTE/LTE-A system) of the Layer 2 that is a lower layer.

More specifically, the third sublayer receives data from a specific layer (e.g., TCP/IP layer) through a logical path configured for each TTI and stores the received data in a buffer (a first buffer) of the third sublayer. In this instance, the buffer of the third sublayer is present for each configured logical path.

For example, the buffer of the third sublayer may be present as follows.
   Data 1 from eMBB (enhanced mobile broadband) DRB that will not apply duplicated data TX
   Data 2 from URLLC DRB that will apply duplicated data TX In this instance, the eMBB DRB and the URLLC DRB indicate a logical path for providing eMBB services and a logical path for providing URLLC services, respectively.

The third sublayer duplicates (or replicates) data, which will apply the duplicated data TX among data stored in the buffer, as many as the number of configured logical paths or the number of multi-cell/multi-carrier.

More specifically, the third sublayer performs a header compression function (e.g. Robust Header Compression (ROHC) function in PDCP layer) reducing a header size of data that is relatively large in size and contains unnecessary control information, in order to efficiently transmit data stored in the buffer via a radio interface.

Further, the third sublayer performs a ciphering function (e.g. ciphering function in PDCP layer) for security of original data using ciphering keystream, etc., so that a third device other than the transmitting device and the receiving device does not recover date.

The third sublayer duplicates data transmitted through a logical path, which will apply the duplicated data TX, as many as the number of multi-cell/multi-carrier. Namely, the third sublayer duplicates (or replicates) data (a first data) for providing a specific service as many as the number of configured logical paths or the number of multi-cell/multi-carrier and generates multiple same data.

Next, the third sublayer delivers the generated multiple same data to the second sublayer.

In this instance, when multiple same data is redundantly transmitted via multi-cell, a portion of the multiple same data may be transmitted to a second sublayer of another transmitting device via a specific interface protocol connecting between transmitting devices for the redundant transmission.

Each second sublayer reconfigures each of multiple same data transmitted from the third sublayer according to radio resources of the allocated lower layer through a segmentation and concatenation function.

In this instance, the second sublayer may exist as many as the number of multiple same data, and each second sublayer may reconfigure each of multiple same data.

More specifically, the second sublayer receives data from the third sublayer through a plurality of logical paths configured for each TTI and stores the received data in a buffer (a second buffer) of the second sublayer. In this instance, the buffer of the second sublayer may be present for each configured DRB.

For example, the buffer of the second sublayer may be present as follows.
   Data 1 in eMBB (enhanced mobile broadband) DRB second sublayer transmission buffer
   Data 2 in URLLC DRB second sublayer transmission buffer
   Duplicated data from data 2 in URLLC DRB second sublayer transmission buffer Next, the second sublayer segments and/or concatenate data stored in each buffer of the second sublayer according to an allocated amount of radio resources of Layer 1 (e.g., a PHY layer).

In this instance, the allocated amount of radio resources may be determined depending on radio conditions, a transmission power, transmission resources, quality of service (QoS) of a logical path, and the like.

Each second sublayer delivers reconfigured data to a first sublayer (e.g., an MAC layer) of the Layer 2 that is the lower layer.

The first sublayer multiplexes multiple datas received from a plurality of second sublayers and delivers the multiplexed multiple datas to the Layer 1.

More specifically, the first sublayer receives and multiplexes multiple same data for providing a specific service from the second sublayer in each TTI and transmits the multiplexed multiple same data on a cell (or a component carrier) corresponding to each logical path in S10030.

There may exist the following three methods for multiplexing data by the first sublayer.

Firstly, the first sublayer may multiplex datas of different services transmitted through different logical paths into one data and transmit the multiplexed one data on the same cell (or a component carrier) corresponding to a logical path.

Secondly, the first sublayer may multiplex each of multiple datas of different services transmitted through different logical paths and transmit the multiplexed multiple data on the same cell (or component carrier) corresponding to a logical path.

In this case, data of a specific service (e.g. URLLC service requiring high reliability and low latency) can be preferentially transmitted according to a priority of a logical path.

Alternatively, when a priority of a specific logical path is configured as infinity, data of other services in the same cell is not transmitted, and only data of a specific service may be transmitted through the logical path whose the priority is configured as infinity.

Thirdly, the first sublayer may multiplex each of datas of different services transmitted through different logical paths and transmit the multiplexed datas on different cells (or component carriers) corresponding to a logical path. In this case, the different cells may be different subbands (or component carriers) of the same cell.

Next, when the transmitting device receives a response message indicating successful reception of multiple same data from the receiving device, the transmitting device can stop the transmission of the multiple same data in S10040.

More specifically, when one of second sublayers of the receiving device successfully receives one of multiple same data, a third sublayer of the transmitting device transmits an indication to a second sublayer of the transmitting device and informs the second sublayer of a stop of the transmission (or retransmission) of the multiple same data.

In this instance, the third sublayer may inform the second sublayer of the transmission stop of multiple same data through the following methods.

In case of the transmission of downlink data using multi-cell, an indication indicating the transmission stop may be transmitted as a control message via a specific interface (e.g., Xd interface) between the base stations.

In case of the transmission of downlink data using multi-carrier or the transmission of uplink data using multi-cell/multi-carrier, an indication indicating the transmission stop may be delivered from a third sublayer to a second sublayer through an internal operation of the transmitting device.

In the case where a third sublayer and a second sublayer are physically connected, an indication indicating a transmission stop may be delivered from the third sublayer to the second sublayer through an internal operation of the transmitting device.

In the case where a third sublayer and a second sublayer are not physically connected, an indication indicating a transmission stop may be transmitted as a control message via a specific interface (e.g., Xd interface) between the base stations.

The second sublayer, that receives an indication indicating a transmission stop from the third sublayer, stops the transmission and/or the retransmission of data stored in a buffer according to a specific mode.

For example, the second sublayer in a transparent mode or an unacknowledged mode stops the transmission of data stored in the buffer, and the second sublayer in an acknowledged mode stops both the transmission and the retransmission of data stored in the buffer.

Through the above-described method, the transmitting device duplicates data of a specific service and redundantly transmits multiple same data, thereby satisfying requirements of a specific service, in particular, services requiring high reliability and low latency.

FIGS. 11 to 13 illustrate an example of a multiplexing method for transmitting the same data proposed by the present specification.

FIGS. 11 to 13 illustrate in detail a method for multiplexing data in a transmitting device described in FIG. 10.

As shown in FIGS. 11 to 13, a second sublayer for reconfiguring data for providing services may exist as many as the number of data or the number of configured logical paths, and datas reconfigured by the second sublayer are multiplexed by a first sublayer.

FIG. 11 illustrates an example of a method for multiplexing datas of different services transmitted through different logical paths into one data and transmitting the multiplexed one data on the same cell (or component carrier) corresponding to a logical path.

Referring to FIG. 11, data of eMBB service and data of URLLC service transmitted through different logical paths are multiplexed into one data and then are transmitted on the same cell.

In FIG. 11, (a) illustrates an example of a case of redundantly transmitting multiple same data via multi-cell, and (b) illustrates an example of a case of redundantly transmitting the same data via different component carriers of the same cell.

As shown in (a) of FIG. 11, the same data replicated for providing URLLC service is transmitted to another base station via a specific network interface.

The transmitted same data is multiplexed and is transmitted on a component carrier CC2 corresponding to a logical path.

As shown in (b) of FIG. 11, when the same data is redundantly transmitted via different component carriers of the same cell, duplicated data is multiplexed on the same cell and is transmitted on a component carrier CC2 corresponding to a logical path.

FIG. 12 illustrates an example of a method for multiplexing each of datas of different services transmitted through different logical paths and transmitting the multiplexed multiple datas on the same cell (or component carrier) corresponding to a logical path.

Referring to FIG. 12, data of eMBB service and data of URLLC service transmitted through different logical paths each are multiplexed and then are transmitted on the same cell. In this instance, data of the URLLC service requiring high reliability and low latency can be preferentially transmitted.

Further, when a priority of a logical path configured for providing the URLLC service is configured as infinity, eNB 1 can transmit only data for providing the URLLC service on a component carrier CC1.

In FIG. 12, (a) illustrates an example of a case of redundantly transmitting multiple same data via multi-cell, and (b) illustrates an example of a case of redundantly transmitting the same data via different component carriers of the same cell.

As shown in (a) of FIG. 12, the same data replicated for providing URLLC service is transmitted to another base station via a specific network interface.

The transmitted same data is multiplexed and is transmitted on a component carrier CC3 corresponding to a logical path.

As shown in (b) of FIG. 12, when the same data is redundantly transmitted via different component carriers of the same cell, duplicated data is multiplexed on the same cell and is transmitted on a component carrier CC2 corresponding to a logical path.

FIG. 13 illustrates an example of a method for multiplexing each of datas of different services transmitted through different logical paths and transmitting the multiplexed datas on different cells (or component carriers) corresponding to a logical path.

Referring to FIG. 13, data of eMBB service and data of URLLC service transmitted through different logical paths each are multiplexed and then are transmitted on different cells or different subbands of the same cell.

In FIG. 13, (a) illustrates an example of a case of redundantly transmitting multiple same data via multi-cell, and (b) illustrates an example of a case of redundantly transmitting the same data via different component carriers of the same cell.

As shown in (a) of FIG. 13, the same data duplicated for providing URLLC service is transmitted to another base station via a specific network interface.

The transmitted same data is multiplexed and is transmitted on a component carrier CC3 corresponding to a logical path.

As shown in (b) of FIG. 13, when the same data is redundantly transmitted via different component carriers of the same cell, duplicated data is multiplexed on the same cell and is transmitted on a component carrier CC3 corresponding to a logical path.

FIGS. 14 and 15 illustrate an example of a method and a de-multiplexing method for receiving and processing the same data proposed by the present specification.

Referring to FIGS. 14 and 15, when transmission of multiple duplicate data via multi-cell/multi-carrier is activated, a UE or a base station may receive and recover multiple same data via multi-cell or multi-carrier.

More specifically, a receiving device (the UE or the base station) may receive multiple same data from a transmitting device in S14010. In this instance, the multiple same data is transmitted on one or more cells or component carriers corresponding to a logical path configured for transmitting the multiple same data.

A first sublayer of Layer 2 of the receiving device de-multiplexes the transmitted multiple same data in S14020 and delivers the de-multiplexed multiple same data to a second sublayer.

More specifically, the first sublayer receives multiple same data transmitted on multi-cell/multi-carrier in each TTI and performs the de-multiplexing of the multiple same data.

There may exist the following three methods of the de-multiplexing.

Firstly, when datas of different services transmitted through different logical paths are multiplexed into one data and are transmitted on the same cell, the first sublayer de-multiplexes the transmitted data, maps the de-multiplexed data to a logical path configured for providing each service, and delivers the mapped data to the second sublayer.

For example, as shown in (a) of FIG. 15, data transmitted on a component carrier 1 CC1 is de-multiplexed.

Data for providing eMBB service among de-multiplexed datas is mapped to a logical path for providing the eMBB service and is delivered to the second sublayer. Further, data for providing URLLC service among the de-multiplexed datas is mapped to a logical path for providing the URLLC service and is delivered to the second sublayer.

Data transmitted on a component carrier 3 CC3 is de-multiplexed, is mapped to a logical path for providing the URLLC service, and is delivered to the second sublayer.

Secondly, when datas of different services transmitted through different logical paths each are multiplexed and are transmitted on the same cell, the first sublayer de-multiplexes the transmitted data, maps the de-multiplexed data to a logical path configured for providing each service, and delivers the mapped data to the second sublayer.

For example, as shown in (b) of FIG. 15, data transmitted on a component carrier 1 CC1 is de-multiplexed, is mapped to a logical path for providing the URLLC service, and is delivered to the second sublayer.

Further, data transmitted on a component carrier 3 CC3 is de-multiplexed, is mapped to a logical path for providing the URLLC service, and is delivered to the second sublayer.

In this instance, because a priority of the logical path for providing the URLLC service is higher than a priority of the logical path for providing the eMBB service, data providing the URLLC service via the component carrier 1 CC1 is transmitted earlier.

Thirdly, when datas of different services transmitted through different logical paths each are multiplexed and are transmitted on different cells, the first sublayer de-multiplexes the transmitted data, maps the de-multiplexed data to a logical path configured for providing each service, and delivers the mapped data to the second sublayer.

For example, as shown in (c) of FIG. 15, data transmitted on each component carrier or on a subband of each component carrier is de-multiplexed, and data for providing each service is mapped to a logical path for providing URLLC service and is delivered to the second sublayer.

The second sublayer receives the de-multiplexed data from the first sublayer and performs a radio link control function in S14030.

Namely, the second sublayer receives de-multiplexed data including multiple same data from the first sublayer through a logical path configured for providing each service in each TTI and performs a radio link control function.

For example, the second sublayer performs a function of HARQ reordering and a reassembly function of segmented or concatenated datas. Further, the second sublayer may decide whether there is a loss of data received according to the configuration and may perform an ARQ function for data recovery.

Next, the second sublayer delivers multiple same data to the third sublayer.

The third sublayer performs a recovery of the received multiple same data in S14040.

More specifically, the third sublayer receives each of multiple same data through each logical path configured for each TTI and stores the data in a reception buffer. In this instance, the reception buffer is present only in one logical path connected to a TCP/IP layer regardless of the number of logical paths for the transmission of multiple same data.

Further, the reception buffer is present for each of logical paths not supporting multiple same data.

The third sublayer performs functions of discarding received data, informing of a transmission stop of multiple same data, or waiting for the reception of multiple same data transmitted in a next TTI, etc. depending on whether or not the multiple same data is received.

More specifically, when the third sublayer successfully receives all of data transmitted on a cell or a component carrier corresponding to a logical path configured for the transmission of multiple same data, the third sublayer discards remaining same data excluding one data from the multiple same data.

When the third sublayer receives at least one data of multiple same data, the third sublayer informs the second sublayer of a reception stop of data through an indication indicating a reception stop of multiple same data.

In this instance, the third sublayer may inform the second sublayer of a reception stop of multiple same data through the following methods.

In case of the transmission of uplink data using multi-cell, an indication indicating a transmission stop may be transmitted as a control message via a specific interface (e.g., Xd interface) between the base stations.

In case of the transmission of uplink data using multi-carrier or the transmission of downlink data using multi-cell/multi-carrier, an indication indicating a reception stop may be delivered from a third sublayer to a second sublayer through an internal operation of the transmitting device.

In the case where a third sublayer and a second sublayer are physically connected, an indication indicating a reception stop may be delivered from the third sublayer to the second sublayer through an internal operation of the transmitting device.

In the case where a third sublayer and a second sublayer are not physically connected, an indication indicating a reception stop may be transmitted as a control message via a specific interface (e.g., Xd interface) between the base stations.

When the third sublayer fails to receive all of multiple same data, the third sublayer waits for the reception of multiple same data transmitted in a next TTI.

Next, the third sublayer transmits recovered data to an upper layer through a corresponding logical path.

The present invention can receive multiple same data for providing a specific service through the above-described method and can efficiently recover data by performing a specific operation depending on whether all or part of the multiple same data has been received.

FIG. 16 illustrates an example of an internal block diagram of a wireless device to which the present invention is applicable.

Here, the wireless device may be a base station and a UE, and the base station includes both a macro base station and a small base station.

As shown in FIG. 16, a base station 1610 and a UE 1620 include communication units (transmission/reception units or RF units) 1613 and 1623, processors 1611 and 1621, and memories 1612 and 1622, respectively.

In addition, the base station and the UE may further include an input unit and an output unit.

The communication units 1613 and 1623, the processors 1611 and 1621, the input units, the output units, and the memories 1612 and 1622 are functionally connected to perform a method proposed by the present specification.

If the communication units (transmission/reception units or RF units) 1613 and 1623 receive information made from physical layer protocol, they transfer the received information to a radio frequency (RF) spectrum, perform filtering, amplification, etc. of the information, and transmit the information to an antenna. Further, the communication units transfer a RF signal received from the antenna to a band that can be processed in the physical layer protocol, and function to perform the filtering.

The communication unit may also include a switch function for switching between the transmission and reception functions.

The processors 1611 and 1621 implement functions, processes and/or methods proposed by the present specification. Layers of radio interface protocol may be implemented by the processor.

The processor may be represented by a controller, a control unit, a computer, and the like.

The memories 1612 and 1622 are connected to the processors and store a protocol or a parameter for performing an uplink resource allocation method.

The processors 1611 and 1621 may include an application-specific integrated circuit (ASIC), other chip set, a logic circuit, and/or a data processing device. The memory may include a read-only memory (ROM), a random access memory (RAM), a flash memory, a memory card, a storage medium, and/or other storage devices. The communication unit may include a baseband circuit for processing a radio signal. When embodiments are implemented in software, the above-described method can be implemented by a module (process, function, etc.) performing the above-described functions.

The module is stored in the memory and can be executed by the processor. The memory may be inside or outside the processor and may be connected to the processor by various well known means.

The output unit (a display or a display unit) is controlled by the processor and outputs information output from the processor together with a key input signal generated in a key input unit and various information signals from the processor.

Furthermore, although the respective figures have been dividedly illustrated for convenience of explanation, it can be designed that embodiments described in the respective figures are combined to implement a new embodiment. It is also within the scope of the present invention to design a computer readable recording medium, in which a program for executing the previously described embodiments is recorded, according to the needs of those skilled in the art.

A direction-based device search method according to the present specification is not limitedly applied to the configurations and the methods of the embodiments described above, but may be implemented by selectively combining all or some of the respective embodiments so that various modifications of the embodiments can be made.

The direction-based device search method according to the present specification can be implemented as a processor-readable code on a processor-readable recording medium included in a network device. The processor-readable recording medium includes all kinds of recording devices for storing data which can be read by a processor. Examples of the processor-readable recording medium include ROM, RAM, CD-ROM, a magnetic tape, a floppy disk, and an optical data storage device, and the processor-readable recording medium also includes a device implemented in the form of a carrier wave, for example, transmission over Internet. In addition, the processor-readable recording medium may be distributed to computer systems connected over a network, and the processor-readable code may be stored and executed in a distributed manner.

Although the preferred embodiments of the present specification have been illustrated and described with reference to a number of illustrative embodiments thereof, numerous other modifications and embodiments may be devised by those skilled in the art that will fall within the scope of the principles of this specification. The modifications should not be individually interpreted from the technical spirit or the prospect of the present invention.

The present specification has described both the article invention and the method invention and may complementally apply the descriptions of the two inventions, if necessary.

INDUSTRIAL APPLICABILITY

Although a RRC connection method in a wireless communication system according to the present invention has been described with reference to examples applied to a 3GPP LTE/LTE-A system, it is also applicable to various wireless communication systems other than the 3GPP LTE/LTE-A system.

The invention claimed is:

1. A method of transmitting, by a transmitting device, data to a receiving device in a wireless communication system, the method comprising:
generating at least one duplicate data using specific data at a first layer of a layer 2 of the transmitting device based on generating the specific data related to a specific service;
transmitting, to the receiving device, the specific data and the at least one duplicate data on at least of a plurality of cells or a plurality of carriers associated with the plurality of radio bearers; and
based on receiving, from the receiving device, an Acknowledgement (ACK) indicating a reception success of the specific data or the at least one duplicate data, instructing stop of transmission of the specific data and the at least one duplicate data from the first layer to a second layer of the layer 2,
wherein, for the plurality of radio bearers, a transmission of duplicate data is indicated by a bearer identifier.

2. The method of claim 1, wherein the first layer performs a header compression function.

3. The method of claim 1, wherein the specific data and the at least one duplicate data are reconfigured by the second layer.

4. The method of claim 1, further comprising:
delivering the specific data from a TCP/IP layer of the transmitting device to the first layer; and
storing the specific data in a first transmission buffer of the first layer.

5. The method of claim 1, wherein a number of the second layers is equal to a number of the specific data and the at least one duplicate data.

6. The method of claim 5, wherein the specific data and the at least one duplicate data are reconfigured through a segmentation and concatenation function based on an allocated resource.

7. The method of claim 6, wherein the allocated resource is determined by radio conditions, a transmission power, a transmission resource, or quality of service (QoS) of each of the plurality of radio bearers.

8. A method of receiving, by a receiving device, data from a transmitting device in a wireless communication system, the method comprising:
receiving, from the transmitting device, specific data and at least one duplicate data on at least of a plurality of cells or a plurality of carriers associated with a plurality of radio bearers;
delivering the specific data and the at least one duplicate data from a first layer of a layer 2 of the receiving device to a second layer of the layer 2 of the receiving device;
storing one data among the specific data and the at least one duplicate data in a reception buffer of the second layer;
discarding remaining data excluding the one data from the specific data and the at least one duplicate data;
instructing stop of transmission of data duplicated with the one data from the second layer to the first layer; and
transmitting, to the transmitting device an Acknowledgement (ACK) indicating a reception success of the specific data or the at least one duplicate data.

9. The method of claim 8, further comprising performing a radio link control function based on the specific data and the at least one duplicate data through the first layer,
wherein the radio link control function is one of a hybrid automatic repeat request (HARQ) function, a reassembly function of segmented or concatenated data, or a recovery function of lost data.

10. The method of claim 9, further comprising:
recovering the one data through the second layer; and
delivering the recovered one data to a TCP/IP layer.

11. A transmitting device for transmitting data to a receiving device in a wireless communication system, the transmitting device comprising:
at least one transceiver configured to transmit and receive a radio signal with an outside; and
at least one processor functionally coupled to the at least one transceiver,
wherein the at least one processor is configured to:
generate at least one duplicate data using specific data at a first layer of a layer 2 of the transmitting device based on generating the specific data related to a specific service;
transmit, to the receiving device, the specific data and the at least one duplicate data on at least of a plurality of cells or a plurality of carriers associated with the plurality of radio bearers; and
based on receiving, from the receiving device, an Acknowledgement (ACK) indicating a reception success of the specific data or the at least one duplicate data, instruct stop of transmission of the specific data and the at least one duplicate data from the first layer to a second layer of the layer 2,
wherein, for the plurality of radio bearers, a transmission of duplicate data is indicated by a bearer identifier.

* * * * *